COMBINED AUTOMATIC PHONOGRAPH AND RADIO

Filed Jan. 24, 1948

INVENTOR.
CHARLEY SIMMONS
BY Martin E. Anderson
ATTORNEY

Patented Dec. 19, 1950 2,534,930

UNITED STATES PATENT OFFICE 2,534,930

COMBINED AUTOMATIC PHONOGRAPH AND RADIO

Charley Simmons, Denver, Colo.

Application January 24, 1948, Serial No. 4,203

1 Claim. (Cl. 179—100.11)

This invention relates to improvements in combination automatic record players and radios.

There is on the market today at least one automatic combined record player and radio in which a number of records are arranged in the order in which they are to be played and in which the sound is reproduced by an electronic device employing a loud speaker.

This machine is of such construction that it will function either as a record player or as a radio receiver.

This machine will play a number of records in the order desired and will automatically stop the motor and parts employed with the record playing. The radio can then function independently of the record player.

However, the machine is so constructed that it will automatically disconnect the record player after the last record has been played, but it will not disconnect the radio and as a result the radio tubes will all be functioning after the record player has been disconnected.

It frequently happens that owners of such machines will select a few of their favorite records and enjoy the music after retiring. If the listener is asleep at the time the last record has been played, the record player motor will be automatically disconnected and the loud speaker will be silent in spite of the fact that the radio is connected with the electric supply circuit and all of the tubes are functioning; current will therefore continue to be consumed by the radio until it is finally manually disconnected. The radio will therefore consume current through the night and sometimes for several nights and days until some one discovers that it is electrically connected with the electric supply and disconnects it by opening the switch provided therefor.

It is the object of this invention to modify the machine to which reference has been made, in such a manner that the record player will automatically disconnect the radio as well as the phonograph motor after the last record in the series has been played.

Another object is to so construct the improved device that by changing a single pole double throw switch the circuit that was automatically opened will be reestablished after which the switch is returned to its original position.

The above and other objects that may become apparent as this description proceeds are attained by the means and the arrangement of parts that will now be described in detail and for this purpose reference will now be had to the accompanying drawing in which the invention has been illustrated, and in which.

Figure 2:
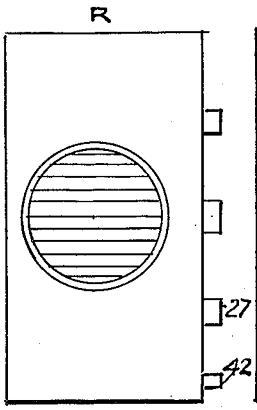
Figure 2 is an end elevation thereof.
Figure 1:
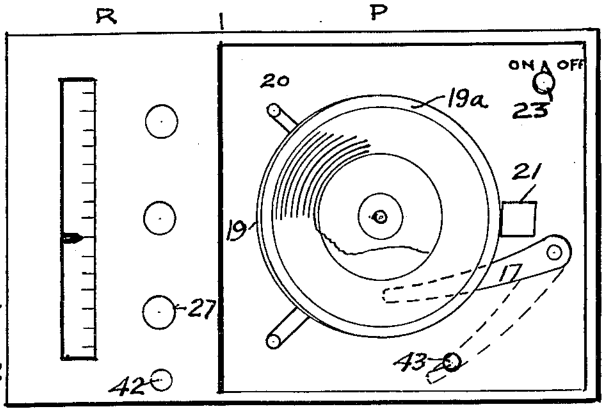
Figure 1 is a top plan view of a combined record player and radio of the type to which this invention relates.

Referring now to the drawing, reference character P represents the phonograph or record player and R represents a radio, the two parts being shown as combined in a single cabinet.

Reference numeral 10 designates a turntable that is carried by a tubular shaft 11 which is rotated from a motor 12 by means of a worm or other suitable gear 13. A rod 14 extends through the tubular shaft and rests on flexible switch contact 15 which is normally in circuit closing engagement with contact 16. Reference numeral 17 designates the tone arm or pick-up which is carried by the upper end of shaft 18. Reference numeral 19 designates the records that rest on the turntable and which have already been played or are in the process of being played. Reference numeral 19*a* designates the remaining records of a group that are waiting to be played. Records 19*a* rest on supports 20 and 21 that are part of an automatic record changing device. A cam 22 forms part of a mechanism for moving the tone arm out of and into record playing position.

Figure 3:
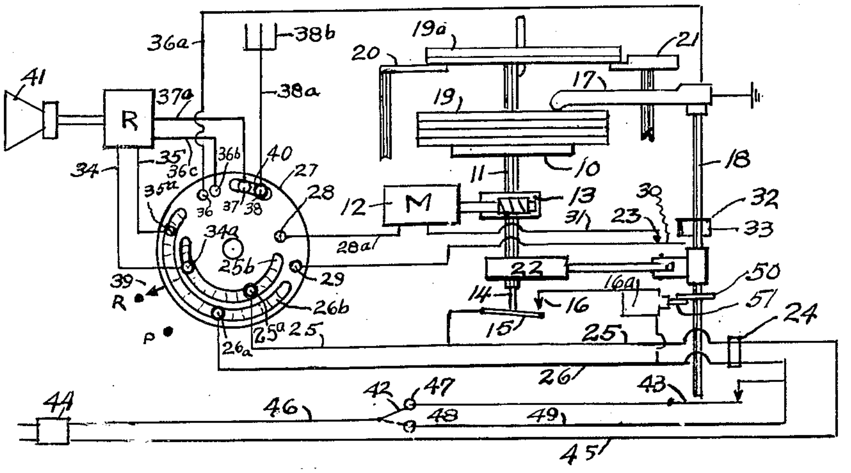
Figure 3 is a circuit diagram.

Applicant is not the inventor of the automatic record changing mechanism that has been indicated in a general way in Figure 3, whose principal elements have been referred to above. The above description of the record player has been given for the purpose of facilitating an understanding of the invention which is in the nature of an addition or an improvement. It is to be understood that the above is not intended for a complete description of the operating mechanism which, as is well known, is complicated.

Applicant's invention has reference in particular to the electric circuit for controlling the operation of the mechanism.

The combined record player and radio that has been used as an example is so constructed that a group of records may be selected and supported as indicated by 19*a*. One record 19 is positioned on the turntable. When the current is applied, the tone arm moves into operative position on record 19. After this record has been played, cam 22, or other equivalent mechanism, moves the tone arm outwardly beyond the area of the record and this operates the supports 20 and 21 to deposit the lowermost record 19*a* onto record 19; whereupon the tone arm returns and plays the new record. After the last record has been played, the tone arm moves outwardly and in addition drops down, opening the circuit to motor 12 by opening switch 23, whereupon the phonograph stops. The radio, however, remains connected, and since it is silent, may remain connected for a long time.

Before applicant's improvement is described, the circuit in common use in such machines, or one that functions in the same manner, will now be described.

The cabinet is provided with a plug socket 24 to which current from the house wiring is connected by means of the usual extension cord, not shown; conductors 25 and 26 extend from the socket to switch 27 and terminate in switch contacts 25*a* and 26*a*. Switch 27 has been shown, for purpose of illustration, as a disk having two arcuate conductors 25*b* and 26*b*; contacts 25*a* and 26*a* are always in wiping contact with conductors 25*b* and 26*b*, respectively. The two contacts 28 and 29 are so positioned that they may be electrically connected with conductors 25*b* and 26*b*, respectively. By turning disk 27 a few degrees in a counterclockwise direction, conductor 25*b* connects contact 25*a* with one motor terminal and conductor 26*b* connects contact 29 with terminal 30, of normally closed switch 23. A conductor 31 connects the other motor terminal with the stationary contact of switch 23. Shaft 18 has an arcuate member 32 with a downwardly extending flange 33 which forms means for opening switch 23 when the tone arm drops down after playing the last record in the group.

Radio R is provided with two conductors 34 and 35 that terminate in stationary switch contacts 34*a* and 35*a*. Switch 27 has four more stationary contacts, 36, 36*b*, 37 and 38 that are connected by conductors 36*a*, 36*c*, 37*a* and 38*a*, respectively, with the electro-magnetic pick-up of the tone arm; the phonographed connection point in the radio the antennae terminal of the radio, and with aerial 38*b*. In Figure 3, the connections are such that the phonograph motor is disconnected. The radio is connected with the power conductor 25 and 26 and the antennae terminal is connected with the aerial and therefore the radio functions as a receiver. If disk 27 is turned counterclockwise until pointer 39 points to P, the arcuate switch contacts 25*a* and 26*a* will be brought into electrical engagement with the stationary switch contacts 28 and 29 in which position motor 12 will function, providing switch 23 is in circuit closing position. When disk 27 is turned to bring pointer 39 to P, contact 40 will shift so as to disconnect the aerial and connect wire 36*a* with stationary contact 36*b*, whereupon the phonograph will control the radio and the sound will emerge from loud speaker 41. Manual means is provided for closing switch 23 while the tone arm is in its lowermost position. The circuit described above and shown on the drawing is illustrative only.

It will be obvious that when switch 23 opens, motor 12 will stop, but the radio will remain connected to the power circuit.

In order to disconnect both the phonograph motor and the radio when switch 23 opens or when the tone arm is lowered at the end of the last record in each group applicant has provided an additional circuit that comprises two switches 42 and 43 and a plug 44. Conductor 45 extends from one terminal of plug 44 to one terminal of socket 24. Conductor 46 is separated into three parts by switches 42 and 43 and when these switches are closed, conductor 46 connects the other terminal of plug 44 with the corresponding terminal of socket 24.

Switch 42 has been shown as a single pole double throw switch having a movable blade and two stationary contacts 47 and 48. Contact 48 is connected to conductor 46 on the far side of switch 43 and the latter may therefore be by-passed by shifting the movable contact of switch 42 so that it will engage contact 48.

Switch 43 is so positioned and arranged that it will open the circuit through conductor 46 when the tone arm drops downwardly at the end of the last record.

When switch 43 opens the current will cut off from both the radio and from the phonograph.

In order to start operating again, switch 23 is manually closed, after which switch 42 is moved so as to send current through conductor 49. After the phonograph motor has operated sufficiently to raise the tone arm, switch 43 will close and the movable arm of switch 42 is then returned to contact 47. If switches 23 and 43 are both open and the parts are as shown in the drawing, the radio will be connected for operation by moving switch arm 42 into engagement with contact 48.

The mechanism that controls the lowering of the tone arm has been illustrated in a diagrammatic manner by switch 15, 16 and electromagnet 16*a*. Shaft 18 has a disk 50 that is supported on the end of solenoid armature 51. When the last record 19*a* has been deposited onto record 19 spring arm 15 raises rod 14 and closes switch 15, 16, thereby withdrawing support 51 permitting the tone arm to drop and open switch 23. Other equivalent means may, of course, be used.

Having described the invention what is claimed as new is:

In a combined automatic record changing phonograph and radio of the type having a turntable, a motor for operating the turntable, a tone arm mounted to oscillate about a vertical pivot for vertical movement and a double pole single throw switch; an electric circuit having a plug at one end, a conductor extending from one of the plug terminals to a terminal on the double pole switch, another conductor extending from the other terminal of the plug to the other terminal of the double pole switch, said last conductor having two switches in series, the switch nearer the double pole switch terminal being normally closed, the switch nearer the plug being a single pole double throw type having a movable switch member connected with said other plug terminal and two contacts positioned for alternate engagement by the movable switch member, one of said contacts being connected with the adjacent terminal of the normally closed switch, the other contact being connected with the far terminal thereof forming a by-pass, conductors connecting the motor terminals with the other double pole switch terminals, one of said last named conductors having a normally closed switch in series therewith, means operated by the downward movement of the tone arm when the last record of a series has been played for opening both of said normally closed switches, thereby stopping the motor, and means comprising said double pole switch for disconnecting the radio from the tone arm and connecting it with an antenna.

CHARLEY SIMMONS.

REFERENCES CITED

The following references are of record in the file of this patent:

UNITED STATES PATENTS

| Number | Name | Date |
|---|---|---|
| 1,852,877 | Gardner | Apr. 5, 1932 |
| 1,852,878 | Gardner | Apr. 5, 1932 |
| 1,969,344 | Andrews | Aug. 7, 1934 |